United States Patent Office 3,614,996
Patented Oct. 26, 1971

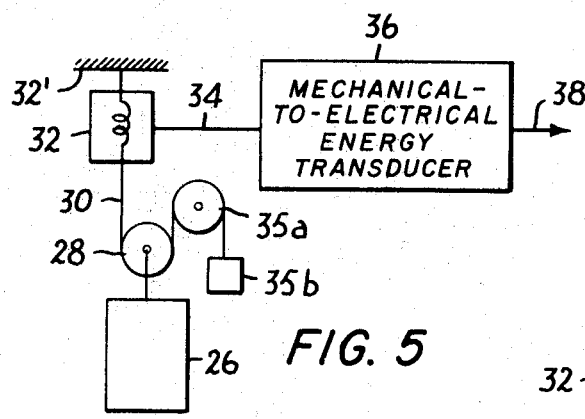
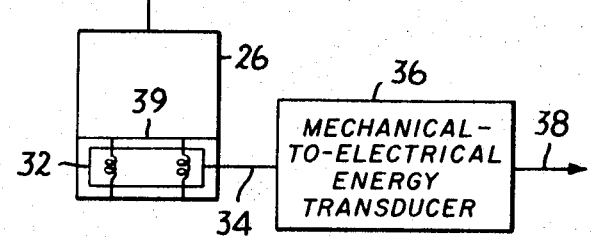
FIG. 5
FIG. 6
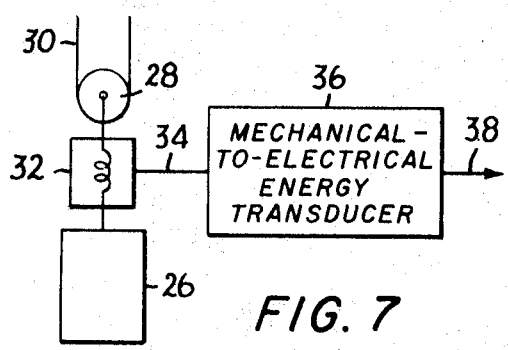
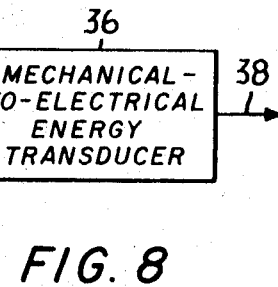
FIG. 7
FIG. 8
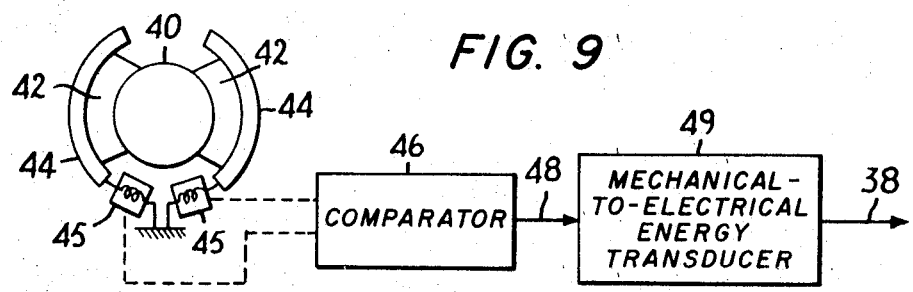
FIG. 9
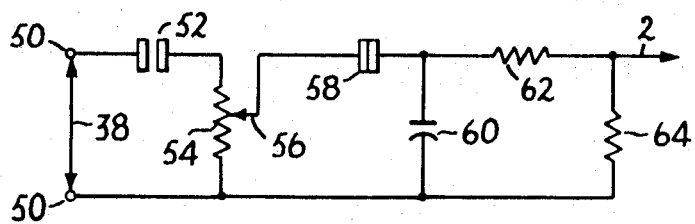
FIG. 10

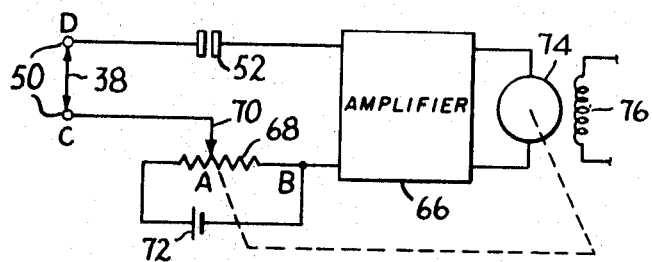
FIG. 11
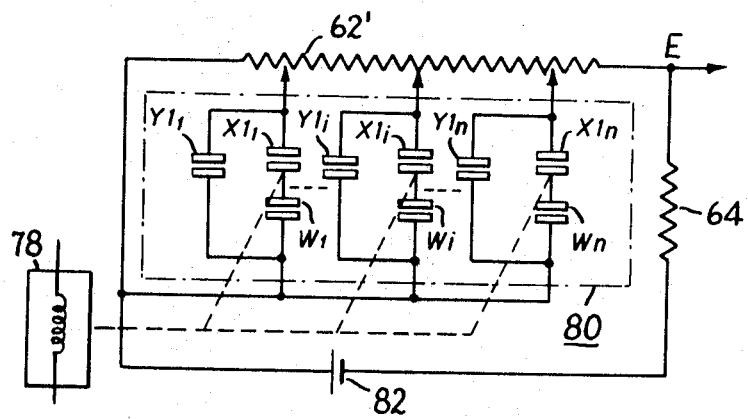
FIG. 12
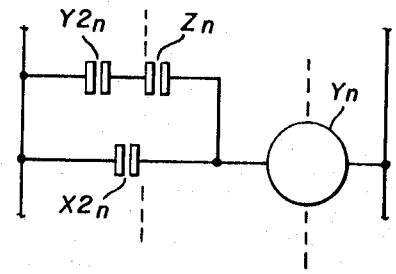
FIG. 13
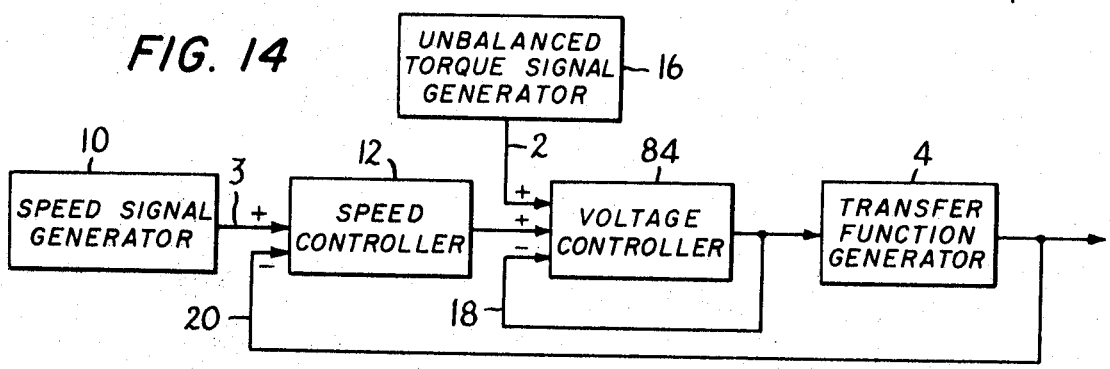
FIG. 14
FIG. 15

3,614,996
ELEVATOR CONTROL SYSTEM
Kenji Saito, Kunihiro Hattori, and Hiroshi Kamaike, Inazawa, and Hiroshi Sugimoto, Kobe, Japan, assignors to Mitsubishi Denki Kabushiki Kaisha, Tokyo, Japan
Filed Nov. 26, 1969, Ser. No. 880,165
Claims priority, application Japan, Nov. 29, 1968, 43/87,381
Int. Cl. B66b 1/30
U.S. Cl. 187—29 R         18 Claims

ABSTRACT OF THE DISCLOSURE

An elevator control system includes a negative feedback type controller applied with both a signal for counterbalancing an unbalanced torque applied to an elevator's drive circuit and stored in a memory, and a speed signal for an elevator car. The former signal is applied to the controller not only before the car starts but also after the speed signal has been applied to the controller. Thus the car is smoothly started without a discontinuity of signal level between both signals applied to the controller.

BACKGROUND OF THE INVENTION

This invention relates to improvements in an elevator control system.

In order to prevent elevator cars from receiving shocks upon starting, to reduce a loss in time occurring during the starting operation, a starting system has been previously proposed in which a hoist mechanism preliminarily applied with a torque for counterbalancing an unbalanced torque applied thereto prior to start up, and then a brake is released to start the associated elevator car. In elevator control systems utilizing the abovementioned measure, a speed signal has been provided to the hoist mechanism immediately after the application of the counter-balancing torque, and then the associated car has been put into operation in accordance with an operational pattern determined by that speed signal.

In the elevator control systems of the prior art type referred to, the switching of a signal for unbalanced torque to a speed signal has inevitably caused a discontinuity of signal level due to a difference in level or magnitude between both the signals. In elevator control systems previously employed, the response speed was not high enough to follow the discontinuity of the signal level just described so that the discontinuity of the abovementioned measure had scarcely come into question. Lately, however, elevator systems have the tendency to be operated at a high speed with a rapid response through the use of the static drive system utilizing semiconductor elements such as thyristors. Under these circumstances, the control as previously described has been disadvantageous in that the starting characteristics have been extremely deteriorated.

SUMMARY OF THE INVENTION

An object of the invention is to provide a new and improved elevator control system which has a high response speed, while imparting smooth starting characteristics to the associated elevator car.

With the above object in view, the invention resides in an elevator control system comprising hoist means for driving an elevator car, speed signal generator means for generating a speed signal for determining the speed of the elevator car, speed control means connected to the speed signal generator means to control the speed of the elevator car in accordance with the speed signal, detector means for detecting an unbalanced torque applied to the hoist means to provide a signal counterbalancing the unbalanced torque, and a current control means connected to the speed control means, characterized in that memory means are connected to the detector means to store the counterbalancing signal from the detector means, and the output of the memory means is connected to the current control means, the current control means being responsive to both the signals from the speed control means and the signal stored in the memory means to control a current flowing through the hoist means, while the output signal from the memory means is supplied to the current control means during and after the generation of the speed signal.

The detector means for detecting the unbalanced torque may include means comprising a resilient member displaceable in response to a tension or pressure applied thereto due to a loading on the elevator car, and mechanical-to-electrical transducer means for converting a displacement signal provided by the detection means to an electrical signal.

Alternatively, the detector means for detecting the unbalanced torque may include one pressure sensor disposed below each of a pair of brake arms, capable of being coupled to a brake drum for the hoist means, to sense a pressure applied to the associated brake arm, and mechanical-to-electrical transducer means for converting a difference between both the pressure to an electrical signal.

The memory means may include a capacitor element first charged with the output from the unbalanced torque detector means during the balancing operation, and then discharged when the speed signal is generated by the speed signal generator means, while serving to supply the output from the detector means to the current control means. Alternatively, the memory means may comprise a potentiometer which is energized by a source of direct current and includes thereon a slidable arm to which is applied the output voltage from the unbalanced torque detector means, and a servomotor driven in accordance with a difference between the output voltage from the detector means and a voltage on the slidable arm to move the slidable arm toward a direction to decrease the difference between such voltages.

Voltage control means may be substituted for the current control means to control a voltage applied across the hoist means.

BRIEF DESCRIPTION OF THE DRAWINGS

The invention will become apparent from the following detailed description taken in conjunction with the accompanying drawings in which:

FIGS. 5 through 9 are diagrammatic views of various forms of the unbalanced torque-detection device shown in FIG. 3;

FIGS. 10, 11 and 12 are diagrammatic views of various forms of the memory shown in FIG. 3;

FIG. 13 is a schematic circuit diagram of a holding circuit used with the arrangement shown in FIG. 12;

FIGS. 14 and 15 are block diagrams of different modifications in accordance with the elevator control system of the invention.

Throughout the several figures, like reference numerals designate corresponding or similar components.

DESCRIPTION OF THE PREFERRED EMBODIMENTS

Figure 1:
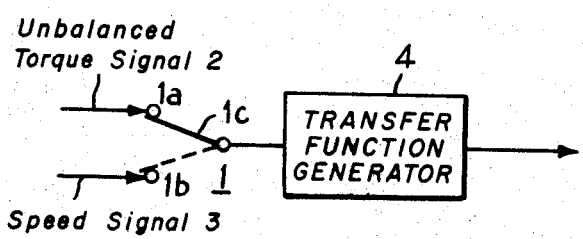
FIG. 1 is a schematic diagram of the prior art type of elevator control systems.

Referring now to FIG. 1, there is schematically illustrated the conventional type of elevator control systems operative to initially apply to the hoist mechanism a torque counterbalancing an unbalanced torque previously existing thereon, followed by the release of the brake to effect start up. For purposes of explanation, the term "balancing operation" means the operation of intiially applying to a hoist mechanism a torque counterbalancing an unbalanced torque previously applied thereto. The arrangement illustrated comprises a relay generally designated by the reference numeral 1, and including a pair of stationary contacts 1a, and 1b, and a transfer contact arm 1c.

The stationary contact 1a has applied thereto a signal 2 for unbalanced torque and the other contact 1b has applied thereto a speed signal 3 while the transfer contact arm 1c is adapted to engage the contact 1a during the balancing operation and the contact 1b during the travel of the associated elevator car. The transfer arm 1c is connected to a transfer function generator 4 for determining the characteristics of the associated elevator control system.

Figure 4:
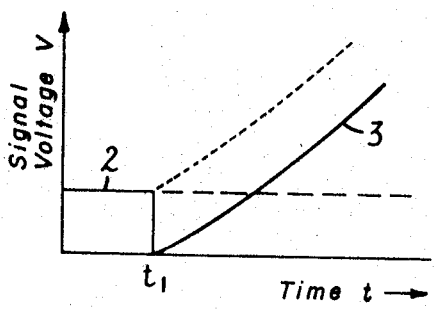
FIG. 4 is a graphical representation of the operational characteristics useful in explaining the operation of the invention.

In the system illustrated, the transfer of the unbalanced torque signal 2 to the speed signal 3 has inevitably caused a discontinuity of a signal level due to a difference in level between both the signals such as shown at by the solid line in FIG. 4. Therefore, the system has the disadvantages as previously described.

This invention contemplates the elimination of such disadvantages by the provision of a current feedback loop disposed in an elevator control system, thereby to permit the unbalanced torque and speed signals 2 and 3, respectively, to be applied to the system simultaneously but separately, without transferring the unbalanced signal to the speed signal. Then the unbalanced torque signal is stored in a memory for subsequent coupling as an input to the system when the associated elevator car is traveling, and also when it arrives at the selected floor of the building. This measure results not only in a smooth start-up but also a decrease in the effect of the unbalance torque upon the elevator car during its travel and upon its stopping.

Figure 2:
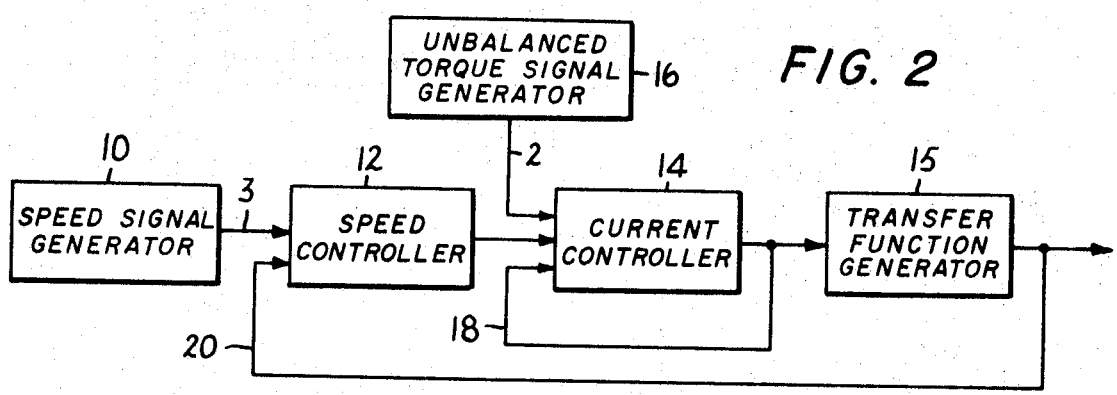
FIG. 2 is a block diagram of an elevator control system constructed in accordance with the principles of the invention.

Referring now to FIG. 2, there is illustrated an elevator control system including a current feedback loop in accordance with the principles of the invention. It is seen that a speed signal generator 10 supplies a speed signal 3 to a speed controller 12 which, in turn, applies its output to a current controller 14 also having applied thereto an unbalanced torque signal 2 from a signal generator 16 for generating a signal counterbalancing an unbalanced torque previously applied to a hoist mechanism (not shown). The output from the current controller 14 is applied to a transfer function generator 15 and also negatively fed back to the input to the current controller 14 as shown at line 18 in FIG. 2. The output from the transfer function generator 15 is operated to control the associated elevator car (not shown) and negatively fed back to the speed controller 12 as shown at line 20 in FIG. 2.

The controllers 12 and 14 are preferably an operational amplifier which may be any one of the vacuum tube type, or the transistorized type, the magnetic amplifier type etc. The speed signal generator 10 may be of the type including a timing relay for forming a stepped voltage pattern and a filter consisting of a capacitor and reactor combination to smooth the voltage pattern from the relay, thereby to generate a speed command signal. Alternatively, it may be of the type in which an integrator and a variable impedance reactor generate an acceleration and a deceleration waveform, respectively, each providing a speed command signal.

If desired, the speed signal generator 10 may be operatively associated with a landing device for detecting the position of the associated elevator car relative to the particular floor at which the car is to stop, and generating a speed command signal in accordance with a distance between the car and that floor on which it is to land.

Figure 3:
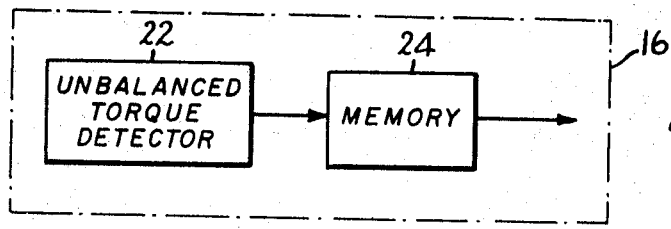
FIG. 3 is a block diagram of the device for generating an unbalanced torque signal shown in FIG. 2.

As shown in FIG. 3, the unbalanced torque signal generator 16 is formed of a detector 22, for detecting an unbalanced torque previously applied to the associated hoist mechanism (not shown), and a memory 24. The unbalanced torque detector 22 may be preferably of such a construction as shown in FIG. 5, particularly suitable for use in a 2:1 roping.

In FIG. 5 an elevator car 26 is hung for vertical movement by a sheave 28 and a length of hoisting rope 30. The length of hoisting rope 30 is rigidly secured at one end to a tension detector 32 formed of any suitable resilient material such as a spring, and operatively coupled at the other end to a hoist mechanism schematically represented by a driven sheave 35a and a counterweight 35b, with the sheave 35a adapted to be driven by an electric motor (not shown). The tension detector 32 can be displaced, or, expanded or contracted, in accordance with a tension under which the length of hoisting rope 30 is tensioned. The tension detector 32 is then suitably fixed to a stationary part 32' and adapted to provide at its output a signal representative of a physical displacement thereof as shown by the reference numeral 34. The signal 34 is applied to a mechanical-to-electrical transducer 36 where it is converted to an electrical signal and produced at an output lead designated by the reference numeral 38.

Therefore, it will be appreciated that the tension detector 32 is responsive to a loading on the car 26 to produce a displacement signal 34 which is, in turn, converted to a corresponding electrical signal and provided at an output 38 from the transducer 36.

FIG. 6 illustrates another form of the unbalanced torque detector 22. The arrangement illustrated can be effective for use in either of 2:1 and 1:1 ropings. In FIG. 6, the elevator car 26 includes a floor surface 39, and a tension detector 32 similar to the detector 32 shown in FIG. 5 and disposed between the floor surface 39 and the bottom surface of the car. In other respects the arrangement is identical to that shown in FIG. 5.

FIG. 7 shows still another form of the unbalanced torque detector 22 substantially similar to that illustrated in FIG. 5 except for the sheave 28 and the tension detector 32 being exchanged in vertical position with each other. The arrangement of FIG. 7 is particularly suitable for use in 2:1 roping.

An arrangement illustrated in FIG. 8 is substantially identical to that shown in FIG. 7 except for the sheave 28 being omitted.

It is noted that the hoist mechanism as shown in FIG. 5 is not illustrated in FIGS. 6, 7 and 8 for purpose of simplicity.

As in the arrangement of FIG. 6, the arrangement as illustrated in each of FIGS. 7 and 8 includes a similar mechanical-to-electrical transducer 36 to provide an electrical signal at 38 corresponding to an elongation or a contraction of the tension detector 32, dependent upon a load disposed within the car 26.

FIG. 9 shows another modification of the unbalanced torque detector 22 suitable for use in either of 2:1 and 1:1 ropings. In FIG. 9, a hoist device (not shown) for driving an elevator car such as the car 26 has operatively coupled thereto a brake drum 40, capable of engaging a pair of brake shoes 42 operatively connected to brake arms 44 respectively. Each of the brake arms 44 is operatively associated with a pressure sensor 45, disposed below the same. The pressure sensor 45 may be similar to the tension detector 32. The outputs from both the pressure sensor 45 are supplied to a comparator 46 where they are compared with each other. If a difference exists between the outputs from the pressure sensors 45, the comparator 46 provides an output 48 representative of an unbalanced torque applied to the brake drum 40. This output 48 is supplied to a mechanical-to-electrical transducer 36 similar to the transducer 36 as shown in FIG. 5. Then the transducer 36 provides an electrical signal at 38 as in the arrangement of FIG. 5.

The memory 24 as previously set forth in conjunction with FIG. 3 may be of any one of the constructions illustrated in FIGS. 10 through 13.

An arrangement shown in FIG. 10 utilizes the discharge characteristic of a capacitor, and comprises a pair of output terminals 50 across which is applied the output from the transducer 36, such as shown in FIGS. 5 through 9, and a potentiometer 54 connected across the input terminals 50 through normally open contacts 52 of a balancnig relay (not shown). The balancing contacts 52 are adapted to be closed during the balancing operation and the potentiometer 54 serves to control the magnitude of the unbalanced torque signal. The potentiometer 54 includes a slidable arm 56 connected to normally closed contacts 58 of another relay (not shown) adapted to be opened upon a speed signal entering the system.

Then the contacts 58 are connected to a capacitor 60 having connected thereacross a pair of serially connected resistors 62 and 64. The capacitor 60 and the resistor 64 are returned to the lower input terminal 50 as viewed in FIG. 10. The resistor 62 is chosen to have its resistance much higher than the total resistance of the potentiometer 54.

In the balancing operation, the two sets of contacts 52 and 58 are in their closed position to permit the unbalanced torque signal applied across the input terminals 50 to charge the capacitor 60 while the signal is supplied to a speed controller such as the speed controller 12 shown in FIG. 2 through the junction of both resistors 62 and 64, with a short time constant determined by the magnitudes of the capacitor 60, the potentiometer 54 and resistors 62 and 64.

Then, the speed signal generator such as the generator 10, begins to provide a speed signal whereupon the contacts 58 are opened to terminate the supply of the unbalanced torque signal to the memory, but the capacitor 60 is permitted to discharge with a long time constant determined by the magnitudes of the capacitor 60 and the resistors 62 and 64. Therefore, this is equivalent to the condition wherein the electrical signal at 38, provided by the unbalanced torque detector such as the detector 22, has been stored in the memory of FIG. 10 and is being supplied to the current controller 14.

FIG. 11 shows a memory utilizing a servomotor system. As shown, the upper input terminal 50 is connected to an amplifier 66 at one input terminal thereof, through balancing relay contacts 52 identical in operation to the contacts 52 shown in FIG. 10, and the lower input terminal 50 is connected to the amplifier 66 at the other input terminal thereof, through a potentiometer 68 including a slidable arm 70 connected to the lower terminal 50. The potentiometer 70 has both ends connected across a source of direct current 72 while the output of the amplifier 66 is connected to a servomotor, that is, the armature 74 of the servomotor is mechanically interlocked with the slidable arm 70 on the potentiometer 68. The servomotor includes a field winding 76.

It is now assumed that while a balancing operation is being performed, an unbalanced torque signal at 38, with the lower terminal 50 positive respect to the upper terminal 50, is higher than a voltage drop between that point A on the potentiometer 68 contacted by the slidable arm 70 and a point B intermediate the potentiometer 68 and the amplifier 66. Under the assumed condition, a current resulting from the unbalanced torque signal at 38 flows from the lower terminal 50, through the point A, the point B and the armature 74 and back to the upper terminal 50 to rotate the armature 74 in one direction to slide the arm 70 along the potentiometer 68 in the corresponding direction. Then, the signal 38 is equal in magnitude to the above-mentioned voltage drop, whereupon the armature 74 and therefore the slidable arm 70 is caused to stop. At that time that voltage drop developed between the points A and B provides an output from an unbalanced torque signal generator such as shown in FIG. 2.

If the signal 38 is less in magnitude than the voltage drop between the point A and the point B, then the process is reversed from that described above to provide an output from the unbalanced torque signal generator in the similar manner. In this way the unbalanced torque signal generator provides an unbalanced torque signal during the balancing operation.

After the completion of the balancing operation, the balancing contacts 52 are open. The opening of the contacts 52 prevents current from flowing through the armature 74, thereby maintaining the armature, and hence the slidable arm 70, stationary. Therefore the voltage across the points A and B remains unchanged and provides the storage of the unbalanced torque signal.

FIGS. 12 and 13 show still another modification of the memory for storing discrete magnitudes of an output from a tension or pressure detector such as described above in conjunction with FIGS. 6 through 8. More specifically, a tension or pressure detector 78 formed of any suitable resilient member is operatively associated with a group of contacts generally designated by the reference numeral 80. The group of contacts 80 is operatively connected to a resistor $62'$ which is, in turn, connected in series with a resistor 64 across a source of direct current 82. The groups of contacts 80 comprises a predetermined number $n$ of triads of normally open contacts, each including a set of balancing contacts W identical in operation to the contacts 52 as shown in FIG. 10, a set of control contacts X1 serially connected to each set of balancing contacts W, and a set of holding contacts Y1 connected across the series combination of the contacts W and X. The contacts Y1 and W are controlled by the respective relays (not shown).

The detector 78 is mechanically coupled to all the control contacts of mechanical type $X1_1 \ldots X1_1 \ldots X1_n$ such that they respond to predetermined discrete magnitudes of displacement of the detector 78 to be closed. When the detector 78 effects no displacement, the contacts X1 are in their open position. When the detector 78 effects a displacement in response to a tension of the associated hoisting rope such as previously described, the contact $X1_1$ is first closed in response to a first increment of the displacement and the contact $X1_2$ is closed in response to a second increment thereof while the contact $X1_1$ remains closed and so on. If the detector 79 effects a predetermined maximum magnitude of its displacement, then the last contact $X1_n$ is closed with the remaining contacts are maintained in their closed position. The control contacts are further connected to predetermined intermediate taps on the resistor $62'$ in order to provide the junction E of the resistors $62'$ and 64 a voltage proportional to the particular magnitude of the output from the detector 78.

The balancing contacts W are adapted to be closed during the balancing operation in which a balancing relay (not shown) is energized.

FIG. 13 shows a holding circuit for maintaining holding relays in this case relay $X_n$ in its energized position. When energized, a holding relay $Y_n$ closes its holding contacts $Y2_n$ serially connected to normally open contacts $X_n$ adapted to be closed immediately before the balancing operation will have been completed. The control contacts $X2_n$ identical in operation to the contacts $1_n$ are serially connected to the operating winding (not shown) of the holding relay $Y_n$ and in parallel to the series combination of contacts $Y2_n$ and $Z_n$. It is to be noted that one holding circuit such as shown in FIG. 13 is provided for each set of the control contacts $X1_1 \ldots X1_1 \ldots$ $X1_n$ and thereof of the contacts $X1_1 \ldots X1_i \ldots X1_n$.

In the particular balancing operation it is assumed that the control contacts $X_n$ for example have been put in their closed position. Since the associated contacts $W_n$ has been previously closed that portion of the resistor 62' disposed between one end, in this case the lefthand end as viewed in FIG. 12, and the $n$th intermediate tap thereon, is short circuited, whereby a signal corresponding to the particular magnitude of displacement of the detector 78 is provided at the junction E of the resistors 62 and 64 indicating the particular magnitude of the unbalanced torque signal generated during that balancing operation.

The closure of control contact $X1_n$ and therefore contact $X2_n$ also causes the holding relay $Y_n$ to be energized to close the contacts $Y1_n$ and $Y2_n$. Furthermore, the contacts $Z_n$ are closed immediately before the completion of the operation, to cooperate with the closed contacts $Y2_n$ to hold the holding relay $Y_n$ in its energized position to hold its contacts $Y1_n$ and $Y2_n$, after the completion of the balancing operation.

The holding of the contacts $X1_n$ in their closed position permits the potential at the junction E to be maintained at a magnitude proportional to the magnitude of the unbalanced torque signal applied to the group of contacts 80 after the completion of the balancing operation. That is, the potential at the junction E provides the stored magnitude of the unbalanced torque signal after the completion of the balancing operation.

The operation of the arrangement as shown in FIG. 2 will now be described with reference to FIG. 4. In a balancing operation, an unbalanced torque signal from the detector 32 such as previously described in conjunction with FIGS. 5, 6, 7, 8 or 9 is stored in the memory 24 such as previously described for FIGS. 10, 11 or 12 and 13 while it is applied to the current controller 14 as shown at solid curve 2 in FIG. 4. The controller 14 controls a current flowing through the associated hoist mechanism through the transfer function generator 15 so as to counterbalance the particular unbalanced torque as previously applied to the hoist mechanism. Upon completing the balancing operation at a time point $t_1$ (see FIG. 4), the speed signal generator 10 begins to apply a speed signal 3 to the speed controller 12 and therefore to the current controller 14 as shown at solid curve 3 in FIG. 4. It is to be noted that after the speed signal 3 has been applied to the speed controller 12 and therefore to the current controller 14 the unbalanced torque signal 2 continues to be applied to the current controller 14 as shown at dash line in FIG. 4. In other words, the speed signal 3 is superposed upon the stored torque signal 2 so that the input applied to the current controller 14 is smoothly transferred from the unbalanced torque signal 2 to the sum of that signal and the speed signal as shown by the dotted line in FIG. 4, with no discontinuity of the signal level therebetween.

As previously described, the output from the transfer function generator 15 is negatively fed back to the speed controller 12 to compensate for the speed signal 3 provided by the speed generator 10 and, thereby to cause the associated elevator car (not shown) to travel at a command speed determined by the speed signal. On the other hand, the output from the current controller 14 is negatively fed back to its input to cause the current through the hoist mechanism (not shown) to follow a command signal determined by the sum of the above-mentioned stored unbalanced torque signal, which comprises a signal indicating a flow of current counterbalancing the unbalanced torque, and the output from the speed controller 12, which comprises a signal indicating a flow of current through the hoist mechanism counterbalancing a torque required for accelerating or decelerating the car.

In conventional control systems, such as shown in FIG. 1, an unbalanced torque signal 2 is first applied to the transfer function generator 4 through the engagement of the transfer arm 1c with the contact 1a (see FIG. 1) and then the arm 1c is transferred to the contact 1b at a time point $t_1$ (see FIG. 4) to cause a speed signal 3 to be applied to the generator 4. Thus, at the time point $t_1$ at which the unbalanced torque signal has terminated and the speed signal begins to be applied to the transfer function generator 4, a discontinuity of signal level takes place as shown by the solid line in FIG. 4. In contrast, the present system eliminates the occurrence of this discontinuity of signal level as above described and, therefore, can provide an improved control system which is high in response speed and smooth in starting characteristics.

It is noted that during the travel of an elevator car, and upon its landing, the signal counterbalancing the unbalanced torque is applied to the present control system to continuously compensate for the unbalanced torque, whereby an external disturbance due to the unbalanced torque is accordingly reduced, with the result that during its travel and upon its landing, the elevator car is less affected by the unbalanced torque.

If desired, the current controller 14 may be replaced by a voltage controller 84 of negative feedback type as shown in FIG. 14. The voltage controller 84 may be an operational amplifier of vacuum tube type, transistorized type, or magnetic amplifier type.

In the arrangement illustrated in FIG. 14, the voltage controller 84 serves to control a voltage applied across the associated hoist mechanism (not shown) so as to cause a flow of current through the latter having the same function as above described in conjunction with the current controller 14.

FIG. 15 illustrates still another modification of the invention. As shown, the speed signal and unbalanced torque signal generators 10 and 16, respectively, supply their outputs to the speed controller 12 which is, in turn, connected directly to the transfer function generator 4. Thus the abovementioned current or voltage controller is omitted.

As in the arrangements shown in FIGS. 2 and 14, the output from the unbalanced torque generator 16 compensates for the particular unbalanced torque during the balancing operation, resulting in a smooth starting motion. Once the speed generator 10 has begun to provide a speed signal, the unbalanced torque and speed signals are simultaneously supplied in superposed relationship to the speed controller 12 to compensate for any variation in speed of the associated elevator car due to the unbalanced torque. The control system of FIG. 15 has been found to have the characteristics as shown in FIG. 16 wherein the axes of ordinates and abscissas have the same meaning as those of FIG. 4.

Figure 16:
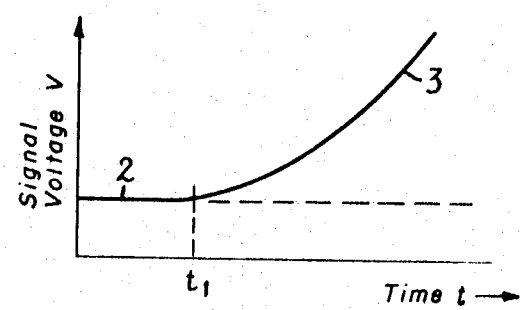
FIG. 16 is a graphical representation of the operational characteristic exhibited by the system shown in FIG. 15.

FIG. 16 illustrates that after the speed signal 3 has been generated at a time point $t_1$, the unbalanced torque signal 2 is effective for controlling the associated elevator car, as shown by the dashed line, while the transfer of the signal to the signal 3 is accomplished with no discontinuity of signal level therebetween.

In summary, the invention provides a control system including a memory for storing a signal for counterbalancing an unbalanced torque previously applied to the associated hoist mechanism and including means for utilizing the output from the memory as a control signal during and after generation of the associated speed signal. The disclosed system eliminates the disadvantage of the prior art control system wherein a discontinuity of signal level occurs when the balancing operation has been completed to terminate the particular unbalanced torque signal. Therefore, when applied to control systems having a high response speed, the invention can impart smooth starting characteristics thereto.

Furthermore, as the unbalanced torque signal is effective for controlling the elevator car during its travel and upon its landing, the unbalanced torque is always compensated for, thereby producing a corresponding decrease in external disturbance of the car resulting from the unbalanced torque, with the result that during its travel and upon its landing, the car is less affected by the unbalanced torque.

While the invention has been illustrated and described in conjunction with several preferred embodiments thereof it is to be understood that numerous changes and modifications may be resorted to without departing from the spirit and scope of the invention. For example, the invention is equally applicable to a variety of control systems for controlling moving bodies other than elevator cars.

What we claim is:

1. An elevator control system comprising, in combination, an elevator car, electrical hoist means for driving said elevator car, speed signal generator means for generating a speed signal for controlling the speed of the elevator car, speed control circuit means connected to said speed signal generator means to produce a control signal to control the speed of the elevator car in accordance with said speed signal, detector means for detecting an unbalanced torque applied to said hoist means and for providing an output signal for counterbalancing the unbalanced torque, memory means connected to said detector means for storing said counterbalancing signal from said detector means, and current control means having input means connected to both said speed control circuit means and said memory means, and having an output connected to said hoist means to control a driving current flowing through said hoist means, the arrangement being such that when and after said speed signal generator means generates said speed signal, the output from said memory means is supplied to said current control means.

2. An elevator control system as claimed in claim 1 wherein said detector means for detecting the unbalanced torque includes tension detection means comprising a resilient member displaceable to produce a displacement indication in response to a tension resulting from a loading on the elevator car, and mechanical-to-electrical transducer means for converting said displacement indication from said tension detection means to an electrical signal.

3. An elevator control system as claimed in claim 1 wherein said detector means for detecting the unbalanced torque includes pressure detection means comprising a resilient member displaceable to produce a displacement indication in response to a pressure resulting from a loading on the elevator car, and mechanical-to-electrical transducer means for converting said displacement indication from said pressure detection means to an electrical signal.

4. An elevator control system as claimed in claim 1 where said hoist means includes a brake drum and first and second oppositely disposed brake arms coupled to said brake drum, and wherein said detector means for detecting the unbalanced torque includes first and second pressure sensors coupled respectively to said first and second brake arms to sense, as a pressure, an unbalanced torque applied to said brake drum, a comparison means for comparing the pressures from both said pressure sensors, and mechanical-to-electrical transducer means connected to said comparison means for converting the result of said comparison to an electrical signal.

5. An elevator control system as claimed in claim 1 wherein said memory means includes a capacitor element which is first charged with the output from said unbalanced torque detector means during a balancing operation, and then discharged when a speed signal is generated by said speed signal generator means to supply the output from said detector means to said current controller when said capacitor element discharges.

6. An elevator control system as claimed in claim 1 wherein said memory means includes a source of direct current, a variable resistor coupled across said source and including a slidable arm thereon, a servomotor, and means connected to said detector means and said variable resistor for driving said servomotor in accordance with a difference voltage between the output signal voltage from said unbalanced torque detector means and a variable resistor voltage dependent on the position of said slidable arm, to move said slidable arm to decrease said difference voltage.

7. An elevator control system comprising in combination, an elevator car, electrical hoist means for driving said elevator car, speed signal generator means for generating a speed signal for controlling the speed of the elevator car, speed control circuit means connected to said speed signal generator means to produce a control signal to control the speed of the elevator car in accordance with said speed signal, detector means for detecting an unbalanced torque applied to said hoist means and for providing an output signal for counterbalancing the unbalanced torque, memory means connected to said detector means for storing said output signal from said detector means, and voltage control means connected to both said speed control means and said memory means to control a driving voltage across said hoist means, the arrangement being such that when and after said speed signal generator means generates said speed signal the output from said memory means is supplied to said voltage control means.

8. An elevator control system as claimed in claim 7, wherein said detector means for detecting the unbalanced torque includes tension detection means comprising a resilient member displaceable to produce a displacement indication in response to to a tension resulting from a loading on the elevator car, and mechanical-to-electrical transducer means for converting said displacement indication from said tension detection means to an electrical signal.

9. An elevator control system as claimed in claim 7 wherein said detector means for detecting the unbalanced torque includes pressure detection means comprising a resilient member displaceable to produce a displacement indication in response to a pressure resulting from a loading on the elevator car, and mechanical-to-electrical transducer means for converting said displacement indication from said pressure detection means to an electrical signal.

10. An elevator control system as claimed in claim 7 wherein said hoist means includes a brake drum and first and second oppositely disposed brake arms coupled to said brake drum, and wherein said detector means for detecting the unbalanced torque includes first and second pressure sensors coupled respectively to said first and second brake arms to sense, as a pressure, an unbalanced torque applied to said brake drum, comparison means for comparing the pressures from both said pressure sensors and mechanical-to-electrical transducer means connected to said comparison means for converting the result of said comparison to an electrical signal.

11. An elevator control system as claimed in claim 7 wherein said memory means includes a capacitor element which is first charged with the output from said unbalanced torque detector means during a balancing operation, and then discharged when a speed signal is generated by said speed signal generator means to supply the output from said detector means to said current controller when said capacitor element discharges.

12. An elevator control system as claimed in claim 7, wherein said memory means includes a source of direct current, a variable resistor coupled across said source and including a slidable arm thereon, a servomotor, and means connected to said detector means and said variable resistor for driving said servomotor in accordance with a difference voltage between the output signal voltage from said unbalanced torque detector means and a variable resistor voltage dependent on the position of said slidable arm, to move said slidable arm to decrease said difference voltage.

13. An elevator control system comprising, in combination, an elevator car, hoist means for driving said elevator car, speed signal generator means for generating a speed signal for use in controlling the speed of the elevator car, detector means for detecting an unbalanced torque applied to said hoist means and for providing an output signal for counter-balancing the unbalanced torque, memory means connected to said detector means for storing said output signal from said detector means, and speed controller means for controlling the speed of the elevator car, said speed controller means having inputs connected to both said speed signal generator means and said memory means, the arrangement being such that when and after said speed signal generator means generates said speed signal the output from said memory means is supplied to said speed controller means.

14. An elevator control system as claimed in claim 13, wherein said detector means for detecting the unbalanced torque includes tension detection means comprising a resilient member displaceable to produce a displacement indication in response to a tension resulting from a loading on the elevator car, and mechanical-to-electrical transducer means for converting said displacement indication from said tension detection means to an electrical signal.

15. An elevator control system as claimed in claim 13, wherein said detector means for detecting the unbalanced torque includes pressure detection means comprising a resilient member displaceable to produce a displacement indication in response to a pressure resulting from a loading on the elevator car, and mechanical-to-electrical transducer means for converting said displacement indication from said pressure detection means to an electrical signal.

16. An elevator control system as claimed in claim 13, wherein said hoist means includes a brake drum and first and second oppositely disposed brake arms coupled to said brake drum, and wherein said detector means for detecting the unbalanced torque includes first and second pressure sensors coupled respectively to said first and second brake arms to sense, as a pressure, an unbalanced torque applied to said brake drum, comparison means for comparing the pressures from both said pressure sensors, and mechanical-to-electrical transducer means connected to said comparison means for converting the result of said comparison to an electrical signal.

17. An elevator control system as claimed in claim 13, wherein said memory means includes a capacitor element which is first charged with the output from said unbalanced torque detector means during a balancing operation, and then discharged when a speed signal is generated by said speed signal generator means to supply the output from said detector means to said current controller when said capacitor element discharges.

18. An elevator control system as claimed in claim 13, wherein said memory means include a source of direct current, a variable resistor coupled across said source and including a slidable arm thereon, a servomotor, and means connected to said detector means and said variable resistor for driving said servomotor in accordance with a difference voltage between the output signal voltage from said unbalanced torque detector means and a variable resistor voltage dependent on the position of said slidable arm, to move said slidable arm to decrease said difference voltage.

References Cited

UNITED STATES PATENTS

| | | | |
|---|---|---|---|
| 3,244,957 | 4/1966 | Spiess et al. | 318—431 |
| 3,486,101 | 12/1969 | Rufli | 318—431 |

ORIS L. RADER, Primary Examiner

W. E. DUNCANSON, Jr., Assistant Examiner

U.S. Cl. X.R.

318—431